United States Patent
Lee et al.

(10) Patent No.: US 8,057,560 B2
(45) Date of Patent: Nov. 15, 2011

(54) FUEL PROCESSOR HAVING MOVABLE BURNER, METHOD OF OPERATING THE SAME, AND FUEL CELL SYSTEM HAVING THE SAME

(75) Inventors: Hyun-chul Lee, Yongin-si (KR); Soon-ho Kim, Yongin-si (KR); Doo-hwan Lee, Yongin-si (KR); Kang-hee Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1303 days.

(21) Appl. No.: 11/657,085

(22) Filed: Jan. 24, 2007

(65) Prior Publication Data
US 2007/0275280 A1    Nov. 29, 2007

(30) Foreign Application Priority Data

May 26, 2006   (KR) .......................... 10-2006-0047544

(51) Int. Cl.
*B01J 8/00* (2006.01)
(52) U.S. Cl. .............. 48/127.9; 48/61; 48/127.1; 48/75; 422/211; 429/19; 429/20; 429/24; 429/12; 60/780; 252/373; 252/376
(58) Field of Classification Search ........... 48/61, 127.9, 48/127.1, 75; 422/211; 429/19–20; 60/780; 252/373, 376
See application file for complete search history.

(56) References Cited

U.S. PATENT DOCUMENTS
6,413,479 B1 * 7/2002 Kudo et al. .................. 422/198

FOREIGN PATENT DOCUMENTS

| CN | 2515557 Y | 10/2002 |
|---|---|---|
| JP | 63-42733 | 2/1988 |
| JP | 2-83028 | 3/1990 |
| JP | 06-330149 | * 5/1993 |
| JP | 5-225899 | 9/1993 |
| JP | 6-330149 | 11/1994 |
| JP | 9-241002 | 9/1997 |
| JP | 11-209102 | 8/1999 |
| JP | P2005-5011 A | 1/2005 |

OTHER PUBLICATIONS

Certificate of Patent No. 200710001793.9 issued by the Chinese Intellectual Property Office for a corresponding Chinese application.

* cited by examiner

*Primary Examiner* — Kaity V. Handal
(74) *Attorney, Agent, or Firm* — Lee & Morse, P.C.

(57) ABSTRACT

A fuel processor having a movable burner, a method of operating the fuel processor, and a fuel cell system having the fuel processor. The fuel processor includes a combustion chamber, a reformer burner, a portion of which is partially disposed inside the combustion chamber, a reformer which is heated by heat transfer from the combustion chamber, and a burner-moving apparatus that moves the reformer burner with respect to the combustion chamber. The method of operating the fuel processor includes determining the load on and a plurality of temperatures within the fuel processor and moving the reformer burner depending upon such information.

16 Claims, 4 Drawing Sheets

FUEL PROCESSOR HAVING MOVABLE BURNER, METHOD OF OPERATING THE SAME, AND FUEL CELL SYSTEM HAVING THE SAME

CROSS-REFERENCE TO RELATED PATENT APPLICATIONS

This application claims the benefit of Korean Application No. 2006-47544, filed May 26, 2006, in the Korean Intellectual Property Office, the disclosure of which is incorporated herein in its entirety by reference.

BACKGROUND OF THE INVENTION

1. Field of the Invention

Aspects of the present invention relate to a fuel processor that includes a reformer to produce hydrogen for a fuel cell using a gaseous fuel or liquid fuel; a shift reactor to decrease the concentration of CO, which is a by-product produced by the reformer; and a preferential oxidation (PROX) reactor. More particularly, aspects of the present invention relate to a fuel processor having a movable reformer burner within the reformer, a method of operating the reformer burner, and a fuel cell system incorporating the movable reformer burner within the reformer.

2. Description of the Related Art

A fuel cell is an electrical generation system that transforms chemical energy directly into electrical energy through a chemical reaction between oxygen and hydrogen, which are removed from the hydrocarbon groups of such materials as ethanol or propanol, or from hydrocarbons such as natural gas or butane.

A fuel cell system includes a fuel cell stack and a fuel processor as main components, and a fuel tank and a fuel pump as auxiliary components. The fuel cell stack has a stacked structure containing a few to many unit cells, wherein each unit cell includes a membrane electrode assembly (MEA) and a separator.

A fuel processor produces hydrogen by reforming a fuel, and the produced hydrogen is supplied to a fuel cell stack. In the fuel cell stack, the hydrogen electrochemically reacts with oxygen to generate electrical energy and form water. The fuel processor reforms hydrocarbon chains or groups using a catalyst. If the starting fuel material contains sulfur, the catalyst can be easily poisoned and lose activity such that the efficiency of the process is compromised. Therefore, it is necessary to remove the sulfur compound from the fuel before the hydrocarbon groups of the fuel are reformed in the fuel processor. Accordingly, the fuel is processed in a desulfurizer before it is fed to the fuel processor for reformation and hydrogen production.

The reformation of the hydrocarbon chains produces hydrogen, carbon dioxide ($CO_2$), and carbon monoxide (CO). Unfortunately, the CO acts as a catalyst poison to the catalytic layer of electrodes in the fuel cell stack. Therefore, the reformed fuel must be processed so as to remove CO before the fuel is supplied to the fuel cell stack. The content of the CO in the fuel supplying to the fuel cell stack is preferably reduced to less than 10 ppm.

In general, CO is removed according to Reaction 1 at both high and low temperatures described as a high temperature shift reaction and low temperature shift reaction, respectively.

$$CO+H_2O \rightarrow CO_2+H_2 \quad \text{[Reaction 1]}$$

The high temperature shift reaction is performed at a temperature of about 400 to 500° C., and the low temperature shift reaction is performed at a temperature of about 200 to 300° C. However, the CO concentration in the fuel remains approximately 5000 ppm although the fuel is processed with the shift reactions.

To reduce the concentration of CO to about 10 ppm level, a preferential oxidation (PROX) reaction, shown below in Reaction 2, and a methanation reaction, shown below in Reaction 3, are used.

$$CO+\tfrac{1}{2}O_2 \rightarrow CO_2 \quad \text{[Reaction 2]}$$

$$CO+3H_2 \rightarrow CH_4+H_2O \quad \text{[Reaction 3]}$$

FIG. 1 is a configuration of a conventional fuel cell system that includes a fuel processor.

Referring to FIG. 1, in a fuel cell system that uses a gaseous fuel, the gaseous fuel is simultaneously supplied to a reformer 40 and a reformer burner 30 from a gaseous fuel tank 10. The gaseous fuel that enters into the reformer 40, for example, a city gas, generally requires a desulfurizer 14 to remove sulfur from the fuel to protect the catalyst within the reformer 40. The gaseous fuel that has passed through the desulfurizer 14 must have a sulfur content of less than 10 ppb.

The reformer burner 30 heats the reformer 40 to maintain the reformer 40 at a reformer temperature of approximately 750° C.

A liquid pump 22 supplies water to the reformer 40 from a water tank 20. The water supplied to the reformer 40.by the liquid pump 22 is preheated by passing through both first and second heat exchangers 71 and 72. A combustion gas from the reformer burner 30 is exhausted to the atmosphere after passing through the first heat exchanger 71, while the hydrogen-rich fuel produced by the reformer 40 is passed through heat exchanger 72 to further heat the water before the water enters the reformer 40.

In the reformer 40, hydrogen, carbon dioxide, and carbon monoxide are generated. The shift reactor 60 decreases the CO concentration in the generated fuel to a predetermined level, for example, 5000 ppm or less. The concentration of CO in the fuel is further reduced to less than 10 ppm in the PROX reactor 65. With the CO concentration sufficiently small upon exit of the PROX reactor 65, the hydrogen-rich, CO deficient fuel is supplied to the fuel cell stack 50.

The reformer burner 30 heats the reformer 40 and, at the same time, preheats the water through first heat exchanger 71 and maintains the temperature of the shift reactor 60 at a predetermined set-point temperature, for example, of about 250° C. using a combustion gas. The reformer burner 30 heats an inner space of a combustion chamber (see FIG. 2), and transfers heat to the reformer attached on surfaces of the combustion chamber 90. Such heat transfer heat to the reformer 40 provides energy for the reformation of the hydrocarbon groups to hydrogen. Typically, the reformer burner 30 is fixed within the combustion chamber of the fuel processor.

When the amount of hydrogen supplied to the fuel cell stack 50 is increased, the reformer temperature of the reformer 40 is reduced since the load on the reformer 40 is increased. So, to maintain the predetermined set-point temperature of the reformer 40, the amount of fuel supplied to the reformer burner 30 may be increased. However, the increase in the amount of fuel delivered to the reformer burner 30 increases the size of a flame, which may damage the combustion chamber. Furthermore, the increase in the amount of fuel supplied to the reformer burner 30 may cause a decrease in combustion efficiency of the reformer burner.

When the amount of hydrogen supplied to the fuel cell stack 50 is decreased, the load on the reformer burner 30 is decreased as the fuel cell stack 50 does not require as much hydrogen to continue operating efficiently. Thus, the amount of fuel supplied to the reformer burner 30 should be decreased.

An optimal position of the reformer burner 30 in the combustion chamber is beneficial for the fuel processor to operate efficiently. If the reformer burner 30 is improperly positioned heat cannot be efficiently transmitted to the reformer catalyst thereby reducing the combustion efficiency of the reformer burner in the combustion chamber and decreasing the overall efficiency of the fuel cell system.

SUMMARY OF THE INVENTION

Aspects of the present invention provide a fuel processor having a movable reformer burner to increase the combustion efficiency of the reformer burner in the combustion chamber and to protect the combustion chamber from the reformer burner's flame by moving the position of the movable reformer burner according to conditions of the reformer within the fuel processor.

Aspects of the present invention also provide a method of operating the fuel processor, including the movable reformer burner.

Aspects of the present invention also provide a fuel cell system incorporating the fuel processor and movable reformer burner.

According to an aspect of the present invention, there is provided a fuel processor having a movable burner, comprising: a combustion chamber; a reformer burner, a portion of which is disposed inside the combustion chamber; a reformer, which is heated by heat from the reformer burner within the combustion chamber; and a burner-moving apparatus, which moves the reformer burner with respect to the combustion chamber.

The burner-moving apparatus may be an actuator that linearly moves the reformer burner with respect to the combustion chamber.

The fuel processor may further comprise a temperature sensor that measures a temperature of a region close to the flame of the reformer burner in the combustion chamber, and a controller that moves the reformer burner using the burner-moving apparatus according to the temperature measured by the temperature sensor.

The fuel processor may further comprise a combustion gas outlet to the side of the burner hole in the combustion chamber.

According to another aspect of the present invention, there is provided a method of operating a fuel processor having a movable burner, the method comprising controlling a position of the reformer burner in the combustion chamber at a normal operating condition according to the measured temperature at a region close to the flame of the reformer burner.

The method further comprises the operations of moving the reformer burner backward out of the combustion chamber when the measured temperature is higher than a predetermined set-point temperature and moving the reformer burner forward into the combustion chamber when the measured temperature is lower than the predetermined set-point temperature. In another aspect of the present invention, the combustion chamber and the reformer burner are both movable with respect to each other in response to measured temperatures of the combustion chamber and/or the reformer.

According to still another aspect of the present invention, there is provided a fuel cell system having the above-described fuel processor containing the movable reformer burner within the combustion chamber. The movable reformer burner is advantageous when the amount of hydrogen supplied to the fuel cell stack is decreased, which decreases the load on the reformer burner because the fuel cell stack does not require as much hydrogen to continue operating efficiently. Such a decrease in load on the reformer burner results in an increase in temperature of the reformer. Typically, the amount of fuel supplied to the reformer burner would be decreased; however, as in this aspect, a movable reformer burner may be moved so as to react to the decrease in the fuel cell stack's need for hydrogen. Again, both the reformer burner and the combustion chamber may be moved in response to the conditions of the fuel cell system.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
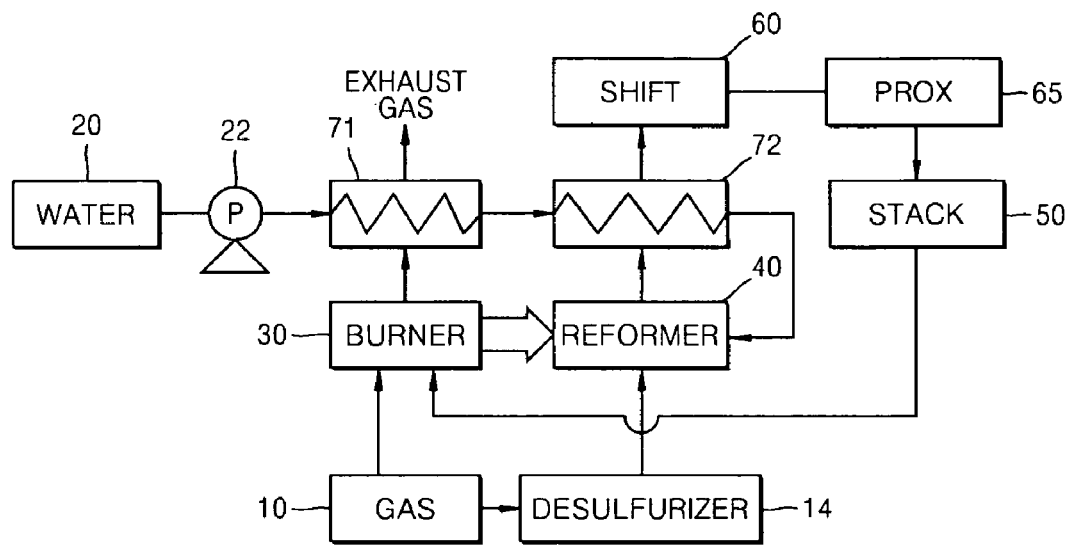
FIG. 1 is a configuration of a conventional fuel cell system having a fuel processor.

Reference will now be made in detail to the preferred embodiments of the present invention, examples of which are illustrated in the accompanying drawings, wherein like reference numerals refer to the like elements throughout. The embodiments are described below in order to explain the present invention by referring to the figures.

Figure 2:
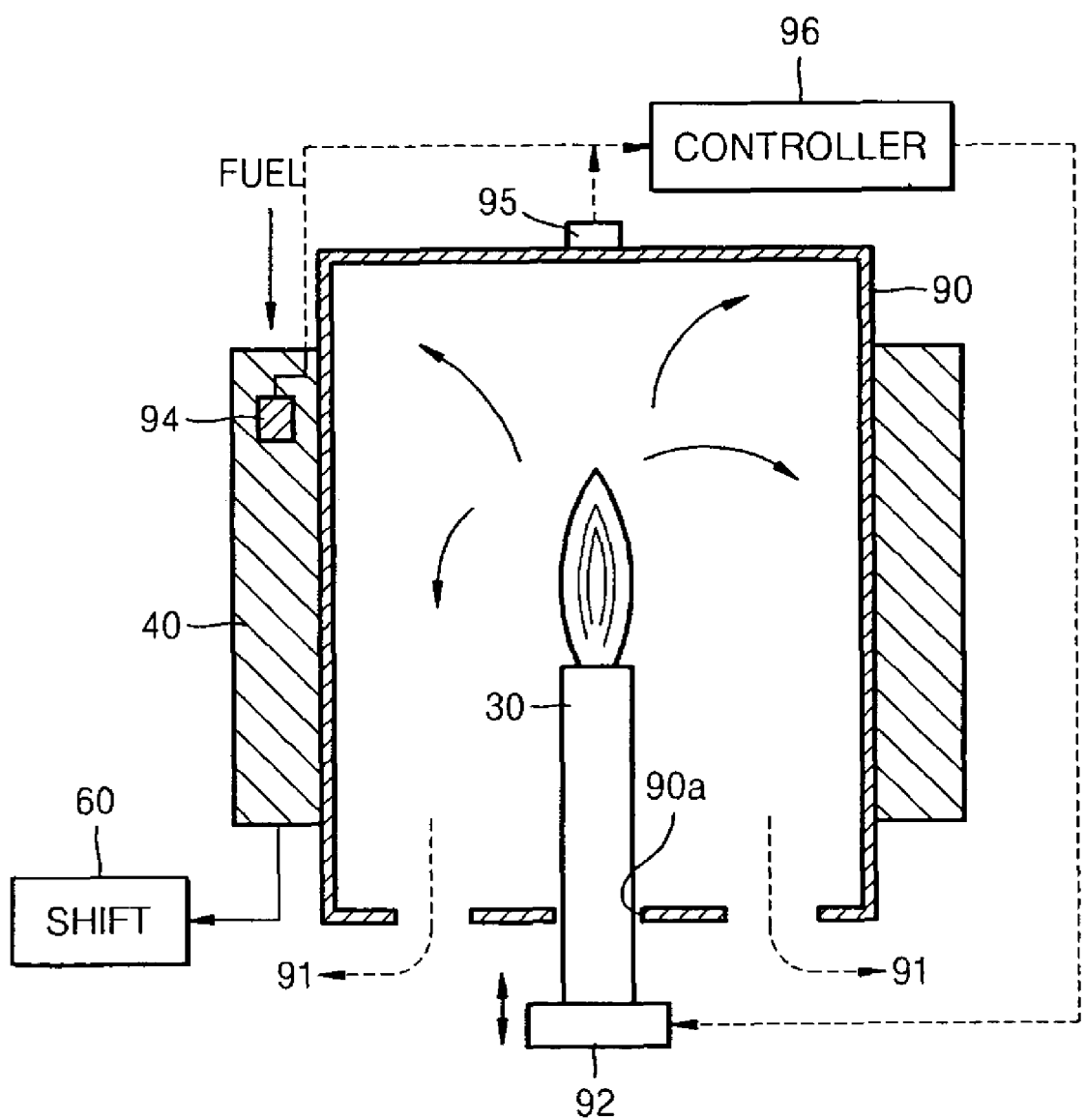
FIG. 2 is a schematic drawing showing a portion of a fuel processor having a movable reformer burner according to an embodiment of the present invention.

FIG. 2 is a schematic drawing showing a portion of a fuel processor having a movable reformer burner 30 according to an embodiment of the present invention. The same reference numerals are used to indicate elements identical with those depicted in FIG. 1, and thus the detailed descriptions thereof will be omitted.

A reformer 40 is installed in contact with a surface of a combustion chamber 90. The reformer 40 is formed to attach on the surface of the combustion chamber 90, but the present invention is not limited thereto, that is, the reformer 40 can be formed to surround the combustion chamber 90 or can be formed on an upper part of the combustion chamber 90 or in any other configuration that provides for efficient heat transfer from the reformer burner 30 to the reformer 40. The reformer burner 30 can be vertically moved up and down with respect to the combustion chamber 90 through a burner hole 90a by a burner-moving apparatus 92. The burner-moving apparatus 92 can be any precisely controlled apparatus such as a DC motor, an air compressor, or an electric actuator.

A gas outlet 91 is formed in the combustion chamber 90 to discharge the combustion gas produced by the reformer burner 30. The gas outlet 91 may be formed on a side of the burner hole 90a so that the combustion gas can effectively heat the entire inner space of the combustion chamber 90.

A first temperature sensor 94 is installed to measure the temperature of the reformer 40. The first temperature sensor 94 can be installed inside the reformer 40. A second temperature sensor 95 is installed to measure the temperature of the combustion chamber 90 where flames of the reformer burner 30 may contact the walls of the combustion chamber 90. The first and second temperature sensors 94 and 95 can be thermocouples that can measure temperature in a range of −200° C. to 1300° C. or any other temperature measuring device that will provide sufficient accuracy for competent control of the movable reformer burner 30 so as to maintain the desired temperature of the reformer 40.

The fuel processor of FIG. 2 includes a controller 96 that moves the reformer burner 30 vertically with respect to the combustion chamber 90 by operating the burner-moving apparatus 92 according to temperature information received from the first and second temperature sensors 94 and 95.

After hydrogen is produced in the reformer 40, the hydrogen-rich fuel is supplied to, as shown here in FIG. 2, the shift reactor 60 to decrease the concentration of CO in the fuel before it is supplied to the fuel cell stack, not shown. As FIG. 2 is merely a portion of the entire process and for simplicity, the hydrogen-rich fuel is not depicted as preheating the water fed to the reformer 40.

Figure 3:
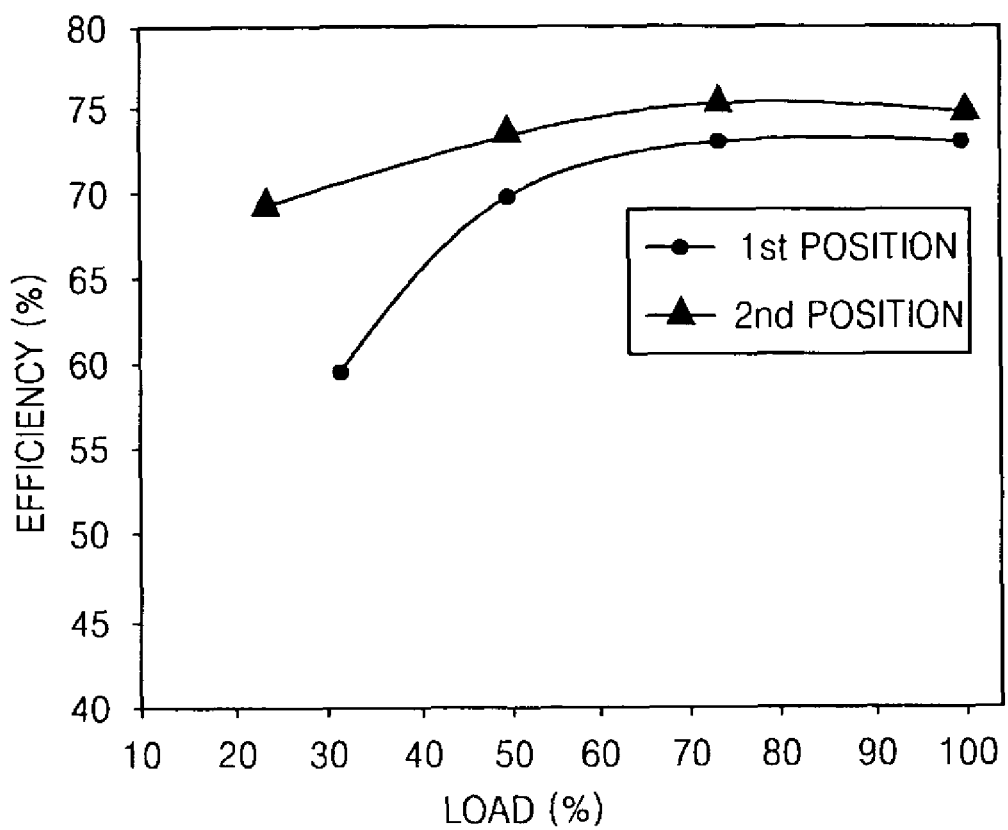
FIG. 3 is a graph showing the combustion efficiency in the combustion chamber of the fuel processor of FIG. 2 according to positions of the reformer burner in the combustion chamber.

FIG. 3 is a graph showing the combustion efficiency in the combustion chamber 90 according to positions of the reformer burner 30 in the combustion chamber 90.

Referring to FIG. 3, when the reformer burner 30 is moved backward from the combustion chamber 90 (first position) and the reformer 40 has a low load, the combustion efficiency is very low. At the same load and when the reformer burner 30 is moved inward into the combustion chamber 90 (second position), the combustion efficiency is improved.

Here, the combustion efficiency denotes the ratio of the calorific value (the amount of hydrogen times the specific calorific value of hydrogen, which is a low heating value) generated at the reformer 40 to the total input calorific value in the reformer 40 and reformer burner 30. The load denotes the quantity of hydrogen generated per hour by the reformer.

When the load of the reformer 40 increases, the consumption of fuel at the reformer 40 and reformer burner 30 is increased, and the thermal efficiency is greatly increased when the reformer burner 30 is positioned at the first position. When the reformer burner 30 is positioned at the second position as the load increases, the increase in thermal efficiency is less than with respect to first position, but still present. However, the overall thermal efficiency is higher when the movable reformer burner is in second position than when the movable reformer burner 30 is at the first position.

The reformer burner 30 can be moved according to the temperature difference between the temperatures measured by the temperature sensors 94 and 95 and the desired set temperatures of the temperature sensors 94 and 95. This control and movement is to protect the combustion chamber 90 from being thermally deformed by the flames of the reformer burner 30 and to achieve optimum combustion efficiency in the combustion chamber 90. The first and second positions are relative positions and can vary according to the size of the combustion chamber 90, material of the combustion chamber 90, and types of fuel used. Furthermore, the reformer burner 30 can be moved in response to a plurality of temperature measurements taken all about both the reformer and the combustion chamber so as to increase the accuracy with which the reformer burner is placed within the combustion chamber.

Figure 4:
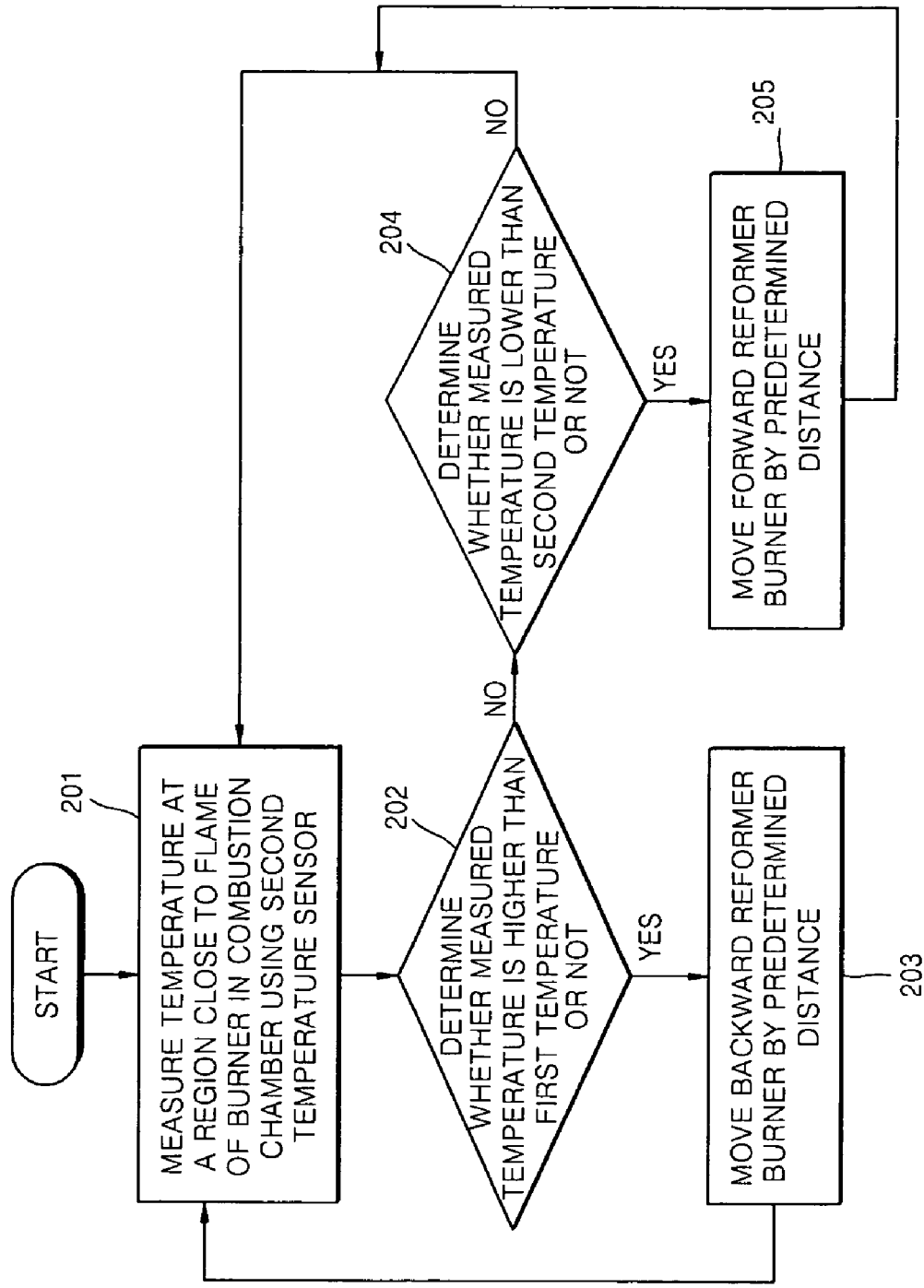
FIG. 4 is a flow chart showing a method of operating the fuel processor of FIG. 2 according to an embodiment of the present invention.

FIG. 4 is a flow chart demonstrating only one logical method of operating the fuel processor of FIG. 2 according to an embodiment of the present invention; however, there are many logical solutions to providing a control system for efficient heating of the reformer 40 and protecting of the combustion chamber 90.

For the purposes of FIG. 4, the temperature detected by the first temperature sensor 94 is use to determine how much fuel should be supplied to the reformer burner 30. If the temperature of the temperature sensor 94 is greater than the predetermined operating temperature, then the amount of fuel supplied to reformer burner 94 is decreased. If the temperature of the temperature sensor 94 is less than the predetermined operating temperature, then the amount of fuel supplied to reformer burner 94 is increased.

At an optimum operating condition when the above logic with temperature sensor 94 is settled and stable, temperature sensor 95 takes a measurement of a region of the combustion chamber 90 close to the flames of the reformer burner 30, which is operation 201 in FIG. 4.

The logic of operations 202 and 204 is simply to determine whether the temperature measured in operation 201 by temperature sensor 95 is within a specific range of predetermined set-point temperatures—a first predetermined set-point temperature and a second predetermined set-point temperature, of which the first predetermined set-point temperature is greater than the second predetermined set-point temperature. Both the first and the second predetermined set-point temperatures are dependent upon the materials used in construction of the combustion chamber 90 and the reformer 40, as well as, the temperatures at which the entire process is expected to operate.

In operation 202, the temperature measure in operation 201 by the temperature sensor 95 is compare to the first predetermined set-point temperature, the upper-bound limit of the desired operating temperature range. If the temperature measured in operation 201 by temperature sensor 95 is greater than the first predetermined set-point temperature, then in operation 203 the reformer burner 30 is moved away from the temperature sensor 95 and out, but not completely out, of the combustion chamber 90 by a predetermined distance using the burner-moving apparatus 92. Upon completion of operation 203, the evaluation begins again at operation 201. If the temperature measure in operation 201 by temperature sensor 95 is less than the first predetermined set-point temperature then the logic moves to operation 204.

Operation 204 determines whether the temperature measured in operation 201 by temperature sensor 95 is lower than that of the second predetermined set-point temperature or lower-bound limit of the desired operating temperature range. If the temperature measured in operation 201 by temperature sensor 95 is lower than that of the second predetermined set-point temperature, then the reformer burner is moved forward or into the combustion chamber, closer to the temperature sensor 95, by the burner-moving apparatus 92. Upon movement of the moving reformer burner 30, the logic operations begin again with operation 201.

If the temperature measured in operation 201 by temperature sensor 95 is higher than that of the second predetermined set-point temperature, then the temperature is within the desired operating temperature range—meaning that the temperature measure in operation 201 is between the first and the second predetermined set-point temperatures; so, no action is taken with respect to moving the movable reformer burner 30. The logic operations merely begin again with operation 201 for a continuous evaluation of the temperatures within the combustion chamber.

Others skilled in the art could easily design logical methods for determination and optimization of the fuel processor. For example, the temperatures detected by temperature sensors 94 and 95 could be compared to determine the proper placement and ensure regular heating of the combustion chamber. In this case, if temperature sensor 94 detected a temperature less than that of temperature sensor 95, then the burner-moving apparatus 92 would move the reformer burner 30 further into the combustion chamber 90; if temperature sensor 94 detected a temperature greater than that of temperature sensor 95, then the burner-moving apparatus 92 would move the reformer burner 30 further out of the combustion chamber 90; if the temperatures detected by temperature sensors 94 and 95 were equal, or within a specified range, then there would be no movement of the movable reformer burner 30.

Furthermore, the invention so far described has only considered movement of the movable reformer burner 30 in one dimension—in or out of the combustion chamber. A movable reformer burner 30 may also move in two or three dimensions in conjunction with a plurality of temperature sensors. For example, a plurality of temperature sensors may be spread throughout a plurality of locations about the combustion chamber and reformer to more accurately determine the heating dynamics of the combustion chamber and reformer. The plurality of temperatures measured can be compared to each other to determine in which direction the movable reformer burner should be moved. Also, the aspects of the present invention allow for the movement of the combustion chamber with respect to the reformer burner, as well as, movement of both the reformer burner and the combustion chamber with respect to each other in response to temperature measurements or load requirements.

A fuel processor having the movable reformer burner according to aspects of the current invention protects the combustion chamber from flames of the reformer burner and moves the reformer burner to control the reformer temperature closer to an optimal condition, thereby increasing the combustion efficiency. Furthermore, the movable reformer burner increases overall efficiency as it can react to different loads on the reformer and temperatures in the combustion chamber to produce the proper amount of hydrogen to supply to the fuel cell stack.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel processor, comprising:
a combustion chamber;
a reformer burner, a portion of which is disposed inside and heats the combustion chamber;
a reformer, which is heated by heat from the combustion chamber, the reformer being in contact with a surface of the combustion chamber;
a burner-moving apparatus, which moves the reformer burner with respect to the combustion chamber;
a temperature sensor that measures a temperature of a region of the combustion chamber or a temperature of the reformer; and
a controller that controls the burner-moving apparatus to move the reformer burner when the temperature measured by the temperature sensor is greater than a first predetermined temperature or is less than a second predetermined temperature, the first predetermined temperature being higher than the second predetermined temperature.

2. The fuel processor of claim 1, wherein the burner-moving apparatus is an actuator that moves the reformer burner with respect to the combustion chamber.

3. The fuel processor of claim 1, wherein the burner-moving apparatus linearly moves the reformer burner with respect to the combustion chamber.

4. The fuel processor of claim 1 wherein the temperature sensor measures a temperature of a region in the combustion chamber close to a flame of the reformer burner.

5. The fuel processor of claim 1, wherein the temperature sensor includes a plurality of temperature sensors placed in a plurality of locations to measure a plurality of temperatures about the combustion chamber and the reformer; and
the controller controls the burner-moving apparatus to move the reformer burner when any one of the plurality of temperatures measured by the plurality of temperature sensors is greater than the first predetermined temperature or is less than the second predetermined temperature.

6. The fuel processor of claim 1, further comprising a combustion gas outlet on a side of a burner hole in the combustion chamber.

7. A method of operating a fuel processor, the method including:
providing the fuel processor, wherein the fuel processor includes a combustion chamber; a reformer burner, a portion of which is disposed inside the combustion chamber; a reformer which is heated by heat from the combustion chamber, the reformer being in contact with a surface of the combustion chamber; and a burner-moving apparatus that moves the reformer burner with respect to the combustion chamber,
measuring a temperature of the combustion chamber or the reformer to provide a measured temperature;
moving the reformer burner backward out of the combustion chamber by a predetermined distance when the measured temperature is higher than a first predetermined temperature; and
moving the reformer burner forward into the combustion chamber by the predetermined distance when the measured temperature is lower than a second predetermined temperature, the first predetermined temperature being higher than the second predetermined temperature.

8. The method of claim 7, wherein:
the measuring of a temperature of the combustion chamber or the reformer includes measuring a plurality of temperatures at a plurality of locations of both the combustion chamber and the reformer; and
the moving of the reformer burner backward out of the combustion chamber and the moving of the reformer burner forward into the combustion chamber are carried out so that the plurality of temperatures at the plurality of locations of both the combustion chamber and the reformer are not higher than the first pre-determined temperature and are not lower than the second predetermined temperature.

9. The method of claim 7, further comprising:
determining a load on the reformer;
determining whether the measured temperature in the combustion chamber or the reformer is sufficient to meet the requirements of the load on the reformer; and
if the temperature is too low, increasing a flow of gaseous fuel to the reformer or adjusting the position of the reformer burner, and if the temperature is too high, decreasing the flow of gaseous fuel to the reformer or adjusting the position of the reformer burner.

10. A fuel processor, comprising:
a combustion chamber;
a reformer burner, a portion of which is disposed inside the combustion chamber at a position, and which heats the combustion chamber through the combustion of a gaseous fuel;
a reformer, which is heated by heat from the combustion chamber, the reformer being in contact with a surface of the combustion chamber;
a temperature sensor to measure a temperature at a location within the fuel processor; and
a burner-moving apparatus, which moves the reformer burner with respect to the combustion chamber,
wherein, the burner-moving apparatus moves the reformer burner in response to the temperature measured by the temperature sensor when the temperature measured by the temperature sensor is greater than a first predetermined temperature or is less than a second predetermined temperature, the first predetermined temperature being higher than the second predetermined temperature.

11. The fuel processor of claim 10, wherein the location comprises a region in or on the combustion chamber near a flame of the reformer burner.

12. The fuel processor of claim 10, wherein the location comprises a region in or on the reformer.

13. The fuel processor of claim 10, wherein the temperature sensor includes a plurality of temperature sensors to measure a plurality of temperatures about the combustion chamber and/or the reformer wherein the burner-moving apparatus moves the reformer burner when any one of the plurality of temperatures measured by the plurality of temperature sensors is greater than the first predetermined temperature or is less than the second predetermined temperature.

14. The fuel processor of claim 10, wherein the burner-moving apparatus moves the reformer burner linearly with respect to the combustion chamber in response to the temperature measured by the temperature sensor.

15. The fuel processor of claim 1, wherein the combustion chamber includes a burner hole through which the burner extends and a gas outlet, the combustion chamber further including a closed end opposite to the burner hole and gas outlet.

16. The fuel processor of claim 15, wherein the combustion chamber includes a burner hole through which the burner extends and a gas outlet, the combustion chamber further including a closed end opposite to the burner hole and gas outlet.

* * * * *